United States Patent
Hansen

(10) Patent No.: US 10,788,387 B2
(45) Date of Patent: Sep. 29, 2020

(54) COMPONENT HAVING A MICROMECHANICAL SENSOR MODULE

(71) Applicant: Robert Bosch GmbH, Stuttgart (DE)

(72) Inventor: Uwe Hansen, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 15/912,049

(22) Filed: Mar. 5, 2018

(65) Prior Publication Data

US 2018/0266909 A1 Sep. 20, 2018

(30) Foreign Application Priority Data

Mar. 16, 2017 (DE) .......................... 10 2017 204 402

(51) Int. Cl.
| | | |
|---|---|---|
| *G01L 19/04* | (2006.01) | |
| *G01L 9/06* | (2006.01) | |
| *G01L 9/12* | (2006.01) | |
| *G01L 27/00* | (2006.01) | |

(52) U.S. Cl.
CPC .............. *G01L 19/04* (2013.01); *G01L 9/065* (2013.01); *G01L 9/125* (2013.01); *G01L 27/002* (2013.01)

(58) Field of Classification Search
CPC .......... G01L 19/04; G01L 9/065; G01L 9/125
See application file for complete search history.

(56) References Cited

U.S. PATENT DOCUMENTS

| | | | |
|---|---|---|---|
| 2009/0303076 A1* | 12/2009 | Setiadi | ..................... H04Q 9/00 340/870.01 |
| 2012/0043999 A1* | 2/2012 | Quevy | ................... H03L 1/022 327/147 |
| 2013/0152696 A1* | 6/2013 | Kalz | ........................ B81B 7/02 73/777 |
| 2014/0331741 A1* | 11/2014 | Shah | ....................... G01N 3/30 73/12.06 |
| 2017/0027058 A1* | 1/2017 | Perkins | ................... H01L 23/60 |
| 2017/0030784 A1* | 2/2017 | Mason | ............... G01M 5/0033 |
| 2017/0123548 A1* | 5/2017 | Shih | ....................... G06F 3/0416 |
| 2017/0137282 A1* | 5/2017 | Sooriakumar | ......... H04R 17/02 |
| 2018/0148316 A1* | 5/2018 | Duqi | ..................... B81B 3/0021 |
| 2019/0208331 A1* | 7/2019 | Besling | ................ B81B 7/0048 |
| 2019/0289405 A1* | 9/2019 | Littrell | ................... H04R 3/007 |
| 2019/0354238 A1* | 11/2019 | Akhbari | ............... G06F 3/0436 |
| 2019/0387326 A1* | 12/2019 | Hansen | .................... H03F 1/26 |

* cited by examiner

*Primary Examiner* — Jamel E Williams
(74) *Attorney, Agent, or Firm* — Norton Rose Fulbright US LLP; Gerard Messina

(57) ABSTRACT

A sensor carrier having a main plane of extension, a first side parallel to the main plane of extension, a second side parallel to the main plane of extension, which is situated opposite the first side, and at least one electrical contact surface situated on the second side. At least one stress-measuring structure is embedded in the sensor carrier. A sensor module having such a sensor carrier as well as to a component having a sensor module having such a sensor carrier, are also described. A method for calibrating a sensor module and a method for operating a sensor module are also described.

11 Claims, 2 Drawing Sheets

COMPONENT HAVING A MICROMECHANICAL SENSOR MODULE

CROSS REFERENCE

The present application claims the benefit under 35 U.S.C. § 119 of German Patent Application No. DE 102017204402.0 filed on Mar. 16, 2017, which is expressly incorporated herein by reference in its entirety.

BACKGROUND INFORMATION

The present invention relates to a sensor carrier having a main plane of extension, having a first side parallel to the main plane of extension, having a second side parallel to the main plane of extension, which is situated opposite the first side, at least one electrical contact surface being situated on the second side.

Micromechanical sensors that pick up measured variables via capacitance or piezo resistive changes detect not only the measured variable itself but always the inherently existing stress of further installation. This arises typically on account of different expansion coefficients of the materials used, which result in warping of the sensor element or of the sensor element installed in the housing. The present invention relates to a novel method of compensating for stress-induced errors in sensor signals.

For reasons of cost-effectiveness, sensor modules are calibrated on a circuit board prior to further installation. Following the further installation, however, sensor modules are subject to a different state of stress than during the calibration so that signal deviations result with respect to the state directly following the calibration. This limits the achievable precision. A calibration in the further installed state is theoretically conceivable, but is not performed for reasons of cost-effectiveness. Proceeding in this manner, it is also not possible to compensate for temperature-induced effects of warping.

For pressure sensors, stress decoupling is achieved (a) in a very costly way using spring structures in the sensor element itself, or (b) by a thick stress-decoupling soft adhesive layer between the sensor element and the carrier. For case (b), there is the aggravating fact that soft adhesives limit the achievable quality in wire bonding and thus limit the service life. Other contacting methods such as flip chip, TSVs or the like would cancel the decoupling of the soft adhesive. Other approaches to solving the problem are stress relief structures in the carriers such as milled slots or injection-molding a soft material around the carriers. All these measures, however, result in increasing the base area of the sensor module and thus in an increase in cost.

SUMMARY

The present invention is based on a sensor carrier having a main plane of extension, having a first side parallel to the main plane of extension, having a second side parallel to the main plane of extension, which is situated opposite the first side, at least one electrical contact surface being situated on the second side.

In accordance with the present invention, at least one stress-measuring structure is embedded in the sensor carrier.

One advantageous development of the sensor carrier of the present invention provides for the stress-measuring structure and the electrical contact surface to be situated in an at least partially overlapping manner in a first direction perpendicular to the main plane of extension.

One advantageous development of the sensor carrier of the present invention provides for the stress-measuring structure to be a piezoelectric or piezoresistive sensor.

One advantageous development of the sensor carrier of the present invention provides for the stress-measuring structure to be connected in an electrically conductive manner to the electrical contact surface.

The present invention also relates to a sensor module having a sensor carrier and having a micromechanical sensor, which is situated on the first side of the sensor carrier.

One advantageous development of the sensor module according to the present invention provides for the micromechanical sensor as well as the stress-measuring structure or even the electrical contact surface to be situated in the first direction in a partially overlapping manner.

The present invention also relates to a component having a sensor module, having a component carrier, the sensor module being connected to the component carrier in an electrically conductive manner via the electrical contact surface.

One advantageous development of the component of the present invention provides for the component carrier to be a circuit board.

One advantageous development of the component of the present invention provides for the sensor module to be connected to the component carrier on the electrical contact surface by way of a soldered connection.

The present invention also relates to a method for calibrating a sensor module, including a sensor module, having the method steps:

(A) calibrating the micromechanical sensor, recording calibration data Da(T) and simultaneously measuring stress data Ds(T) with the aid of the stress-measuring structure at different temperatures T;

(B) storing the calibration data Da(T) and the stress data Ds(T) in an evaluation circuit of the sensor module.

One advantageous development of the method of the present invention for calibrating a sensor module provides for the calibration data Da(T) and the stress data Ds(T) to be detected for different stress states at a constant temperature T in a step (C), prior to step (B).

The present invention also relates to a method for operating a sensor module, including a sensor module, having the method steps:

(a) measuring stress data Ds(T) with the aid of the stress-measuring structure;

(b) compensating a measuring signal of the micromechanical sensor in an evaluation circuit of the sensor module with the aid of stored calibration data Da(T) associated with the stress data Ds(T).

The present invention relates to a novel method to compensate for stress-induced errors in sensor signals and thus to increase the sensor precision. Stress-measuring structures are integrated in the sensor module in order to compensate for influences of further processing and temperature influences. In this manner, an improvement of the signal accuracy or also of the offset is achieved regardless of the origin of the stress. According to the present invention, stress-measuring structures are integrated into the sensor carrier (e.g., an LGA substrate). The sensor is calibrated over temperature and the stress is simultaneously measured. Optionally, in a further step, the sensor parameters for various stress states are detected at constant temperature. The evaluation circuit of the sensor then compensates in measuring operation for the influence of stress on the measured variable regardless of the origin of the stress. The essence of the invention is not to compensate for the stress influences using relief structures, but rather to detect the effective stress—further processing, temperature-induced, etc.—and to compensate for this stress in the signal.

The present invention thus provides for increasing the sensor precision via measuring the stress level applied on the sensor element and for compensating for this stress. Advantageously, the present invention may be used for high-precision micromechanical sensors, in particular high-precision inertial sensors and high-precision pressure sensors. Advantageously, it is possible to use the present invention in all sensors that react sensitively to temperature and/or to mechanical stress induced by further installation.

DETAILED DESCRIPTION OF EXAMPLE EMBODIMENTS

Figure 1:
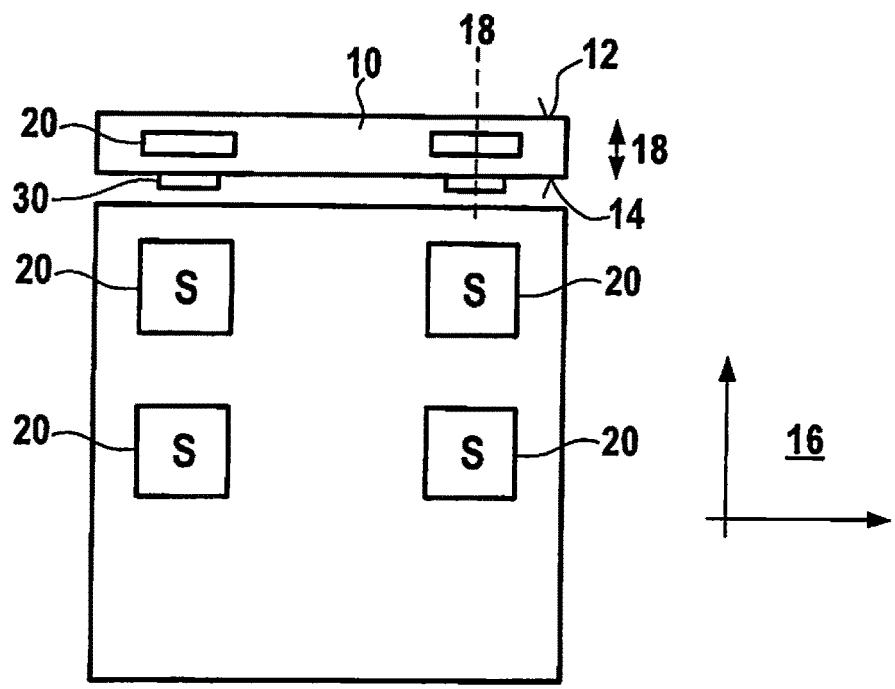
FIG. 1 shows a sensor carrier according to the present invention.

FIG. 1 shows a sensor carrier according to the present invention. This exemplary embodiment shows schematically a sensor carrier 10 having amain plane of extension 16, having a first side 12 parallel to main plane of extension 16 and having a second side 14, which is also situated in parallel to main plane of extension 16 and is situated opposite first side 12. Electrical contact surfaces 30 are situated on second side (14). In accordances with the present invention, stress-measuring structures 20 are embedded in sensor carrier 10. The upper portion of the figure shows a lateral view of sensor carrier 10. The lower portion of the figure shows a partially transparent top view onto first side 12 of sensor carrier 10. The embedded stress-measuring structures 20 are also visible. An LGA is shown by way of example as a sensor carrier 10, which has solder pads as electrical contact surfaces 30. In a first direction 18 perpendicular to main plane of extension 16, stress-measuring structure 20 and electrical contact surface 30 are situated in an at least partially overlapping manner. Stress-measuring structures 20 are piezoelectric or piezoresistive sensors, for example strain gauges.

Figure 2:
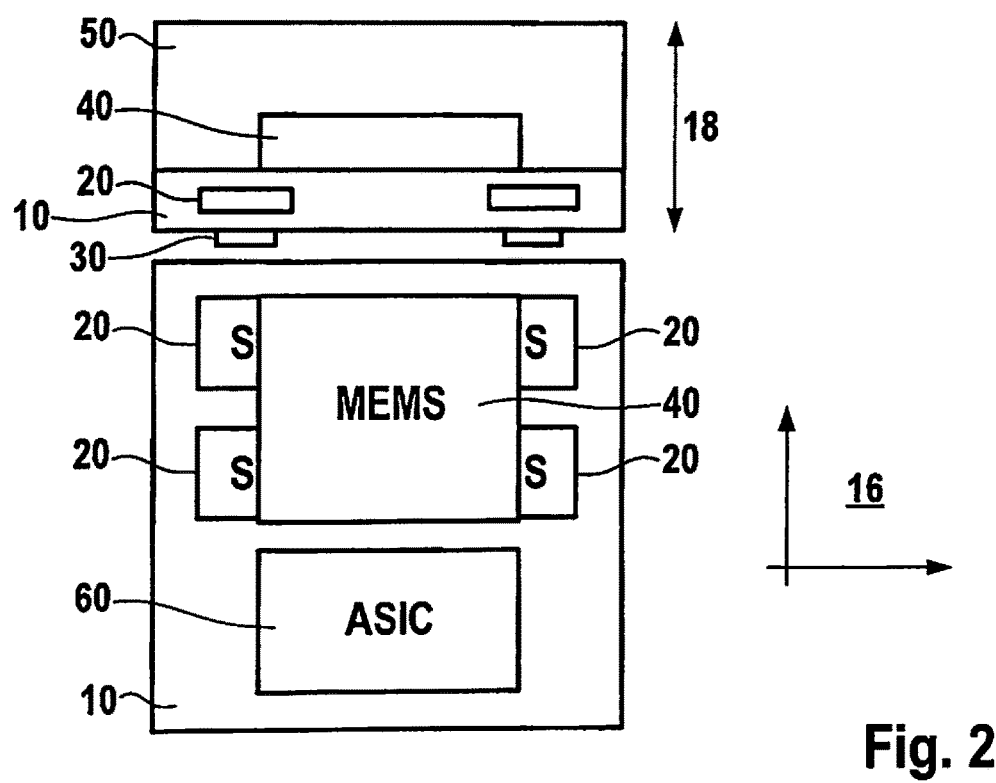
FIG. 2 shows a sensor module according to the present invention including a sensor carrier and a micromechanical sensor.

FIG. 2 shows a sensor module according to the present invention having a sensor carrier and a micromechanical sensor. A sensor module 100 is shown schematically, having a sensor carrier 10, which is fitted with a micromechanical sensor 40 and an evaluation circuit 60 in the form of an ASIC. Micromechanical sensor 40 and evaluation circuit 60 are situated next to each other on the first side 12 of sensor carrier 10. Micromechanical sensor 40 and stress-measuring structures 20 or also electrical contact surfaces 30 are situated in a partially overlapping manner in first direction 18. The upper portion of the figure shows schematically the LGA housing provided with an injection-molded encasement 50. The lower partial figure shows a partially transparent top view onto sensor module 100 except for first side 12 of sensor carrier 10. The embedded stress-measuring structures 20 are also visible.

The arrangement, form and number of the stress-measuring structures depends on the overall geometry of the sensor module. FIGS. 1 and 2 show an arrangement of stress-measuring structures for fitting micromechanical sensor 40 and evaluation circuit 60 side by side on sensor carrier 10. Stress-measuring structures 20 are situated directly below the sensor element. It is assumed that the evaluation circuit (ASIC) is not sensitive to stress. For this reason no stress-measuring structures are provided in this area of the sensor carrier.

Figure 3:
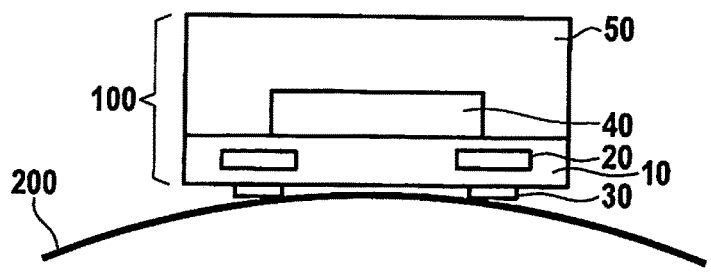
FIG. 3 shows a component according to the present invention including a sensor module and a circuit board.

FIG. 3 shows a component of the present invention including a sensor module and a circuit board.

A component including a sensor module 100 and including a component carrier 200 is shown schematically. Component carrier 200 is a circuit board in this exemplary embodiment. Sensor module 100 is connected in an electrically conductive manner to component carrier 200 via electrical contact surfaces 30. In the present example, sensor module 100 is soldered onto circuit board 200 by solder pads 100. The stress of the circuit board is thus coupled into the sensor module. Due to different CTEs (CTE: coefficient of thermal expansion) of the sensor module and of the circuit board or of another carrier, onto which the sensor module is soldered, the sensor module is warped. The warping shown in FIG. 3 produces a corresponding signal in the stress-measuring structures.

Figure 4A:
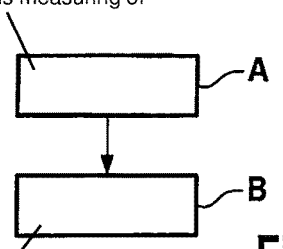
FIGS. 4a and 4b show a method according to the present invention for calibrating a sensor module.
Figure 4B:
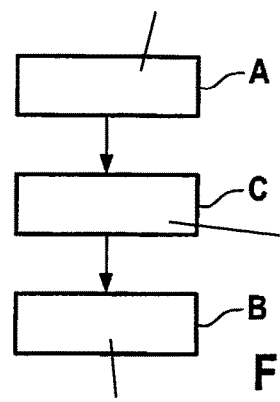

FIGS. 4a and 4b show a method of the present invention for calibrating a sensor module.

FIG. 4a shows a method for calibrating a sensor module 100, including a sensor module 100, having the following method steps:

(A) calibrating the micromechanical sensor 40, recording calibration data Da(T) and simultaneous measuring of stress data Ds(T) using stress-measuring structure 20 at different temperatures T;

(B) storing the calibration data Da (T) and the stress data Ds (T) in an evaluation circuit 60 of sensor module 100.

Thus, in the first step, as is conventionally performed, the sensor module is calibrated over temperature. For this purpose, the sensor module is not soldered on, but is rather retained in a measuring socket. Due to the different CTEs of the materials used, the module undergoes warping, which is compensated for via the calibration. Simultaneously, the signals are taken up in the stress-measuring structures.

FIG. 4b shows the method supplemented by one additional method step. As shown in FIG. 4b, it is optionally possible to record the calibration data Da (T) and the stress data Ds (T) for different stress states in a step C, prior to step B, at constant temperature T.

In the further step C, stress is exerted in a targeted manner on the sensor element at a constant temperature. This may be done, e.g., via a 3-point bearing. The sensor signal is recorded as a function of the stress. The stimulus for the underlying measured variable is kept constant. Depending on precision requirements and the manufacturing tolerances of the sensor module, this step is to be performed only once or multiple times.

Figure 5:
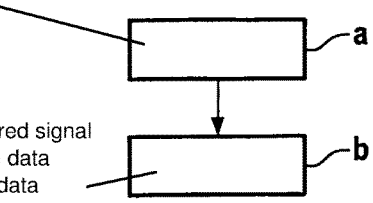
FIG. 5 shows a method according to the present invention for operating a sensor module.

FIG. 5 shows a method of the present invention for operating a sensor module. A method for operating a sensor module 100, including a sensor module 100 of the present invention, is shown schematically having the method steps:

(a) measuring stress data Ds (T) using the stress-measuring structure 20;

(b) compensating for a measured signal of the micromechanical sensor 40 in an evaluation circuit 60 of sensor module 100 using stored calibration data Da(T) associated with the stress data Ds(T).

The calibration algorithm of the module now compensates for the influence of the stress on the basis of calibration data and the signal-dependence of the stress. A high-precision sensor element is thus achieved, which compensates for influences of the further installation and the temperature-dependent warping.

Additional Example Embodiments

Aside from LGAs, the present invention may also be used for leadframe-based housings, housings on the basis of ceramics, premold housings or chip-scale packages.

For additional arrangements such as configurations having stacked chips (stacked die) or a combination of stacked die and side-by-side, the number of stress-measuring structures as well as the arrangement are chosen in such a way that the local stress on the stress-sensitive sensor element may be determined as a function of the structural design.

Apart from embedding the measuring structures into the carrier, it is also possible to position the measuring structures on the carrier.

In another embodiment, it is possible to fit the sensor element on the measuring structures.

An integration of the measuring structures into the MEMS or ASIC is also possible.

List of Reference Numerals

10 LGA
12 first side
14 second side
16 main plane of extension
18 first direction
20 stress-measuring structure
30 solder contact
40 micromechanical sensor
50 injection-molded encasement
60 evaluation circuit (ASIC)
100 sensor module
200 circuit board

What is claimed is:

1. A sensor carrier having a main plane of extension, a first side of the sensor carrier being parallel to the main plane of extension, a second side of the sensor carrier being parallel to the main plane of extension, which is situated opposite the first side, at least one electrical contact surface being situated on the second side, wherein at least one stress-measuring structure is embedded into the sensor carrier,
wherein the stress-measuring structure and the electrical contact surface are situated in an al least partially overlapping manner perpendicularly to the main plane of extension.

2. The sensor carrier as recited in claim 1, wherein the stress-measuring structure is one of a piezoelectric sensor or a piezoresistive sensor.

3. The sensor carrier as recited in claim 1, wherein the stress-measuring structure is connected to the electrical contact surface in an electrically conductive manner.

4. A sensor module, comprising:
a sensor carrier having a main plane of extension, a first side of the sensor carrier being parallel to the main plane of extension, a second side of the sensor carrier being parallel to the main plane of extension, which is situated opposite the first side, at least one electrical contact surface being situated on the second side, wherein at least one stress-measuring structure is embedded into the sensor carrier; and
a micromechanical sensor situated on the first side of the sensor carrier,
wherein the stress-measuring structure and the electrical contact surface are situated in an at least partially overlapping manner perpendicularly to the main plane of extension.

5. The sensor module as recited in claim 4, wherein the micromechanical sensor and at least one of the stress-measuring structure and the electrical contact surface, are situated in the first direction in a partially overlapping manner.

6. A component, comprising:
a sensor module, including a sensor carrier having a main plane of extension, a first side of the sensor carrier being parallel to the main plane of extension, a second side of the sensor carrier being parallel to the main plane of extension, which is situated opposite the first side, at least one electrical contact surface being situated on the second side, wherein at least one stress-measuring structure is embedded into the sensor carrier, and a micromechanical sensor situated on the first side of the sensor carrier; and
a component carrier, the sensor module being connected to the component carrier in an electrically conductive manner via the electrical contact surface,
wherein the stress-measuring structure and the electrical contact surface are situated in an at least partially overlapping manner perpendicularly to the main plane of extension.

7. The component as recited in claim 6, wherein the component carrier is a circuit board.

8. The component as recited in claim 6, wherein the sensor module is connected to the component carrier by a solder connection on the electrical contact surface.

9. A method for calibrating a sensor module, the sensor module including a sensor carrier having a main plane of extension, a first side of the sensor carrier being parallel to the main plane of extension, a second side of the sensor carrier being parallel to the main plane of extension, which is situated opposite the first side, at least one electrical contact surface being situated on the second side, wherein at least one stress-measuring structure is embedded into the sensor carrier, and a micromechanical sensor situated on the first side of the sensor carrier, the method comprising:
(A) calibrating the micromechanical sensor, recording calibration data and simultaneously measuring stress data using the stress-measuring structure (20) at different temperatures; and
(B) storing the calibration data and the stress data in an evaluation circuit of the sensor module,
wherein the stress-measuring structure and the electrical contact surface are situated in an at least partially overlapping manner perpendicularly to the main plane of extension.

10. The method for calibrating a sensor module as recited in claim 9, further comprising:
(C) prior to step (B), detecting the calibration data and the stress data for different stress states at constant temperature.

11. A method for operating a sensor module, the sensor module including a sensor carrier having a main plane of extension, a first side of the sensor carrier being parallel to the main plane of extension, a second side of the sensor carrier being parallel to the main plane of extension, which is situated opposite the first side, at least one electrical contact surface being situated on the second side, wherein at least one stress-measuring structure is embedded into the sensor carrier, and a micromechanical sensor situated on the first side of the sensor carrier, the method comprising:

(a) measuring stress data using the stress-measuring structure; and
(b) compensating for a measured signal of the micromechanical sensor in an evaluation circuit of the sensor module using stored calibration data associated with the stress data.ion of the driver assistance system,
wherein the stress-measuring structure and the electrical contact surface are situated in an at least partially overlapping manner perpendicularly to the main plane of extension.

* * * * *